United States Patent
Parthasarathi et al.

(10) Patent No.: US 11,695,447 B2
(45) Date of Patent: Jul. 4, 2023

(54) COMMUNICATION DEVICE AND METHOD OF OPERATING THE SAME

(71) Applicant: NXP B.V., Eindhoven (NL)

(72) Inventors: Srivathsa Masthi Parthasarathi, Bangalore (IN); Brian Charles Cassidy, Graz (AT); Atmaram Kota Rajaram, Bengaluru (IN); Ghiath Al-kadi, Graz (AT); Hendrik Ahlendorf, Munich (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/303,625

(22) Filed: Jun. 3, 2021

(65) Prior Publication Data
US 2021/0399761 A1    Dec. 23, 2021

(30) Foreign Application Priority Data
Jun. 17, 2020 (EP) .................... 20180455

(51) Int. Cl.
*H04B 1/7163* (2011.01)
*H04B 7/06* (2006.01)
*H04W 84/12* (2009.01)

(52) U.S. Cl.
CPC ......... *H04B 1/7163* (2013.01); *H04B 7/0602* (2013.01); *H04W 84/12* (2013.01)

(58) Field of Classification Search
CPC ...... H04B 1/40; H04B 1/7163; H04B 7/0602; H04W 84/12
See application file for complete search history.

(56) References Cited

U.S. PATENT DOCUMENTS

| | | |
|---|---|---|
| 8,804,690 B1 | 8/2014 | Wheeler et al. |
| 2007/0270097 A1* | 11/2007 | Namm ................. H04B 7/2606 455/11.1 |
| 2009/0258607 A1 | 10/2009 | Beninghaus et al. |
| 2009/0298530 A1 | 12/2009 | Armstrong |

(Continued)

FOREIGN PATENT DOCUMENTS

WO    2019/067105 A1    4/2019

OTHER PUBLICATIONS

Bluetooth Core Specification; Covered Core Package Version 5.1; Publication Date Jan. 21, 2019; Specification vol. 7 Core System Package [Wireless Coexistence Volume].

*Primary Examiner* — David B Lugo (57) ABSTRACT

In accordance with a first aspect of the present disclosure, a communication device is provided, comprising: an ultra-wideband (UWB) communication unit configured to set up a UWB communication channel with a first external communication device; a further communication unit configured to set up a further communication channel with a second external communication device; an antenna configured to be selectively used by the UWB communication unit and the further communication unit; wherein the UWB communication unit is operatively coupled to the further communication unit, and wherein the further communication unit is configured to grant the UWB communication unit access to said antenna in response to receiving a request from the UWB communication unit. This aspect represents a solution to the problem of how to facilitate avoiding that UWB ranging rounds fail in a co-existence system.

12 Claims, 7 Drawing Sheets

(56) References Cited

U.S. PATENT DOCUMENTS

| | | | |
|---|---|---|---|
| 2015/0305053 A1* | 10/2015 | Mintz | H04W 72/10 455/452.1 |
| 2016/0099866 A1* | 4/2016 | Stellick | H04L 45/28 370/225 |
| 2021/0144729 A1* | 5/2021 | Kim | H04W 76/15 |

* cited by examiner

COMMUNICATION DEVICE AND METHOD OF OPERATING THE SAME

CROSS-REFERENCE TO RELATED APPLICATIONS

This application claims priority under 35 U.S.C. § 119 to European Patent Application No. 20180455.6, filed on Jun. 17, 2020, the contents of which are incorporated by reference herein.

TECHNICAL FIELD

The present disclosure relates to a communication device. Furthermore, the present disclosure relates to a corresponding method of operating a communication device.

BACKGROUND

Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

SUMMARY

In accordance with a first aspect of the present disclosure, a communication device is provided, comprising: an ultra-wideband (UWB) communication unit configured to set up a UWB communication channel with a first external communication device; a further communication unit configured to set up a further communication channel with a second external communication device; an antenna configured to be selectively used by the UWB communication unit and the further communication unit; wherein the UWB communication unit is operatively coupled to the further communication unit, and wherein the further communication unit is configured to grant the UWB communication unit access to said antenna in response to receiving a request from the UWB communication unit. This aspect represents a solution to the problem of how to facilitate avoiding that UWB ranging rounds fail in a co-existence system.

In one or more embodiments, the UWB communication unit is configured to transmit said request to the further communication unit after a predefined number of failed UWB communication attempts.

In one or more embodiments, the communication attempts include ranging operations performed with the first external communication device.

In one or more embodiments, the further communication unit is a Wi-Fi communication unit.

In one or more embodiments, the communication device further comprises a processing unit configured to trigger the UWB communication unit to transmit said request to the further communication unit.

In one or more embodiments, the further communication unit is configured to grant the UWB communication unit access to said antenna for a predefined amount of time.

In one or more embodiments, the UWB communication unit and the further communication unit are coupled to each other through a universal asynchronous receiver/transmitter (UART) interface.

In one or more embodiments, the further communication unit is configured to act as a master device to control the usage of the antenna.

In accordance with a second aspect of the present disclosure, a communication device is provided, comprising: an ultra-wideband (UWB) communication unit configured to set up a UWB communication channel with a first external communication device; a further communication unit configured to set up a further communication channel with a second external communication device; a first antenna configured to be used by the UWB communication unit and a second antenna configured to be used by the further communication unit, wherein the first antenna and the second antenna have a shared frequency spectrum; wherein the UWB communication unit is operatively coupled to the further communication unit, and wherein the further communication unit is configured to grant the UWB communication unit access to the shared frequency spectrum in response to receiving a request from the UWB communication unit. This aspect represents an alternative solution to the problem of how to facilitate avoiding that UWB ranging rounds fail in a co-existence system.

In accordance with a third aspect of the present disclosure, a method of operating a communication device is conceived, comprising: selectively using an antenna by an ultra-wideband (UWB) communication unit of the communication device and by a further communication unit of the communication device; setting up, by the UWB communication unit, a UWB communication channel with a first external communication device if the antenna is used by the UWB communication unit; setting up, by the further communication unit, a further communication channel with a second external communication device if the antenna is used by the further communication unit; wherein the further communication unit grants the UWB communication unit access to said antenna in response to receiving a request from the UWB communication unit.

In one or more embodiments, the UWB communication unit transmits said request to the further communication unit after a predefined number of failed UWB communication attempts.

In one or more embodiments, the communication attempts include ranging operations performed with the first external communication device.

In one or more embodiments, the further communication unit is a Wi-Fi communication unit.

In one or more embodiments, a processing unit of the communication device triggers the UWB communication unit to transmit said request to the further communication unit.

In accordance with a fourth aspect of the present disclosure, a method of operating a communication device is conceived, comprising: sharing a frequency spectrum by a first antenna of an ultra-wideband, UWB, communication unit of the communication device and by a second antenna of a further communication unit of the communication device; setting up, by the UWB communication unit, a UWB communication channel with a first external communication device if the first antenna is used by the UWB communication unit; setting up, by the further communication unit, a further communication channel with a second external communication device if the second antenna is used by the further communication unit; wherein the further communication unit grants the UWB communication unit access to said frequency spectrum in response to receiving a request from the UWB communication unit.

In accordance with a fifth aspect of the present disclosure, a computer program is provided, comprising executable instructions which, when executed by a communication device, carry out any one of the methods of the kind set forth.

DESCRIPTION OF DRAWINGS

Embodiments will be described in more detail with reference to the appended drawings, in which.

DESCRIPTION OF EMBODIMENTS

Ultra-wideband (UWB) is a technology that uses a high signal bandwidth, in particular for transmitting digital data over a wide spectrum of frequency bands with very low power. For example, ultra-wide band technology may use the frequency spectrum of 3.1 to 10.6 GHz and may feature a high-frequency bandwidth of more than 500 MHz and very short pulse signals, resulting in high data rates. The UWB technology enables a high data throughput for communication devices and a high precision for the localization of devices.

An ultra-wideband communication unit may be integrated into a mobile device, such as a mobile phone. In that case, the UWB communication unit can be used to perform ranging operations with another UWB communication unit. The latter may for example be integrated into an object that should be unlocked, for example a door, a transit gate or a vehicle. In such a case, access to a vehicle may be granted if a user who is carrying the mobile device approaches the vehicle in an expected manner (i.e., by moving in an expected manner). To communicate with the other UWB communication unit, the UWB communication unit should have access to an antenna of the mobile device. To save space and cost, this antenna may be a shared antenna, for instance an antenna that is shared with another communication unit of the mobile device, such as a Wi-Fi communication unit (i.e., a wireless local area network communication unit). This may be referred to as a co-existence scenario. In such a scenario, the other communication unit often controls the usage of the antenna, in the sense that it acts as a master device, while the UWB communication unit acts as a slave device.

Figure 1:
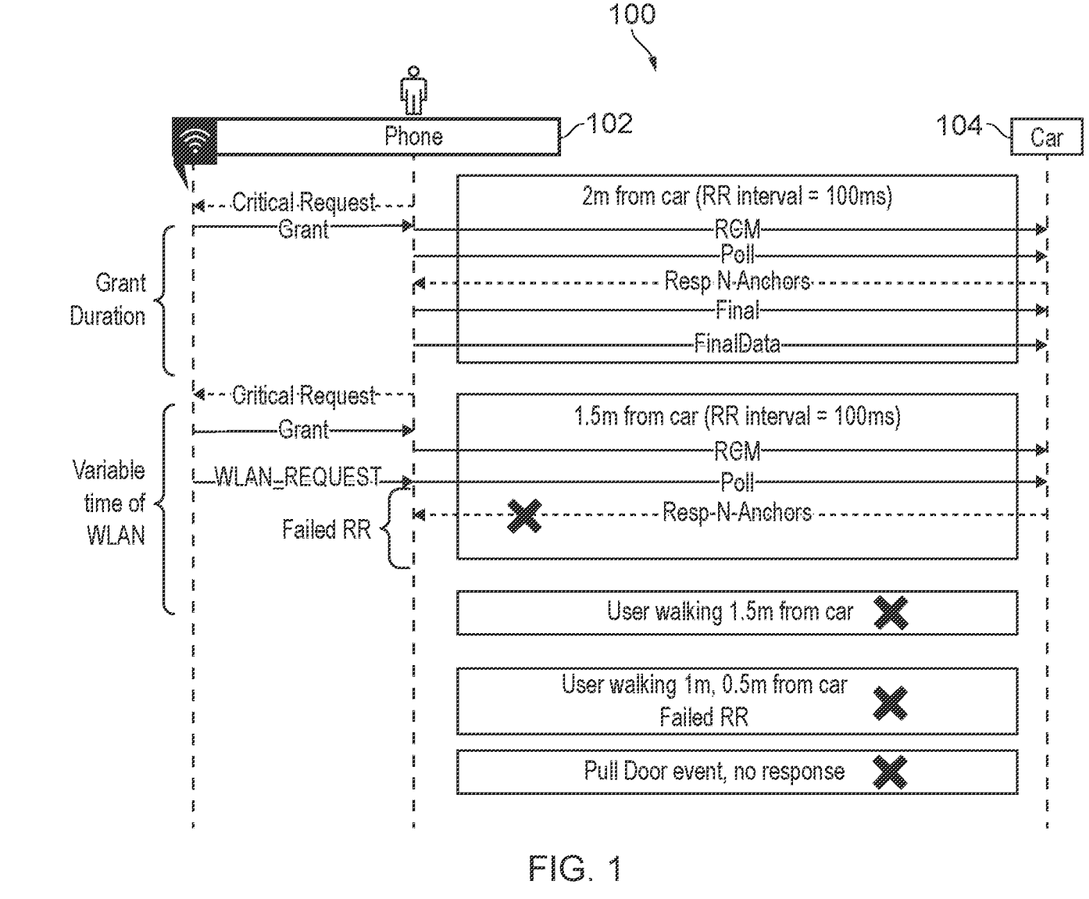
FIG. 1 shows an example of a communication system.

FIG. 1 shows an example of a communication system 100 in which such a shared antenna is used. The communication system 100 includes a mobile phone 102 carried by a user, which performs UWB ranging operations with a car 104. For this purpose, both the mobile phone 102 and the car 104 contain a UWB communication unit (not shown). More specifically, the mobile phone 102 typically performs ranging operations with a plurality of so-called anchor nodes in the car 104, each of which contains a UWB communication unit of the kind set forth. The UWB communication unit of the mobile phone 102 shares an antenna with a Wi-Fi communication unit of the phone 102. A first ranging round (RR) is carried out when the mobile phone 102 is located at approximately 2 meters of the car 104. This ranging round is successfully executed. However, the next ranging rounds, executed at distances of respectively 1.5 meters, 1 meter and 0.5 meter of the car 104, fail because a Wi-Fi communication session is executed by the mobile phone 102, as a result of which the phone's UWB communication unit cannot use the shared antenna. As a consequence, access to the car 104 will not be granted, which will have a negative impact on the user experience. Furthermore, since the first ranging round was successful, but the next ranging rounds failed, no confirmation is given to the car 104 that a user correctly approaches the car 104. In such a case, a security module within the car 104 may for instance infer a malicious intent, such that access to the car 104 will be blocked for a predefined amount of time. This, again, has a negative impact on the user experience.

In a specific example, a UWB device and a Wi-Fi 6 GHz (WLAN) device can share the same antenna in a co-existence system, to save space and cost. In such a system, the WLAN device typically acts as a master device and decides on the priority of occupying the antenna. However, the reliability of UWB ranging and the UWB user experience should not be compromised, because UWB ranging is more real-time in nature compared to a Wi-Fi system which is based on a best-effort protocol. Unfortunately, when the WLAN device acts as master device, UWB ranging rounds may fail and cause a bad user experience.

Now discussed are a communication device and a corresponding method of operating a communication device, which facilitate avoiding that UWB ranging rounds fail in a co-existence system of the kind set forth.

Figure 2:
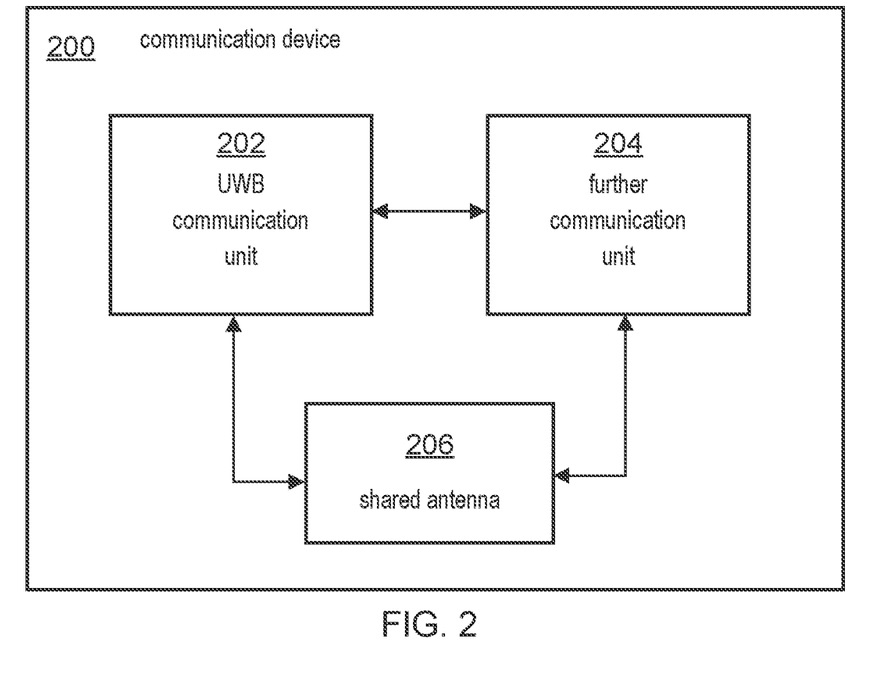
FIG. 2 shows an illustrative embodiment of a communication device.

FIG. 2 shows an illustrative embodiment of a communication device 200. The communication device 200 comprises a UWB communication unit 202, a further communication unit 204 and a shared antenna 206. The UWB communication unit 202 is configured to set up a UWB communication channel with a first external communication device (not shown). The further communication unit 204 is configured to set up a further communication channel with a second external communication device (not shown). Furthermore, the antenna 206 is configured to be selectively used by the UWB communication unit 202 and the further communication unit 204. Furthermore, the UWB communication unit 202 is operatively coupled to the further communication unit 204, wherein the further communication unit 204 is configured to grant the UWB communication unit 202 access to the antenna in response to receiving a request from the UWB communication unit 202. In this way, the UWB communication unit 202 may indicate to the further communication unit that for instance high priority ranging operations should be performed, and the further communication unit 204 may allow the UWB communication unit 202 to use the antenna in response thereto. This, in turn, facilitates avoiding that UWB ranging rounds fail in a co-existence system in which the antenna is shared.

In one or more embodiments, the UWB communication unit 202 is configured to transmit said request to the further communication unit 204 after a predefined number of failed UWB communication attempts (e.g., 3 or more failed UWB communication attempts). In this way, the communication established by the further communication unit 204 does not need to be interrupted until the predefined number of UWB communication attempts has failed. This, in turn, may prevent that the performance of the further communication unit 204 is negatively affected. In one or more embodiments, the communication attempts include ranging operations performed with the first external communication device. Thus, in this way, the UWB communication unit 202 may indicate in a practical manner to the further communication unit 204 that priority should be given to the UWB communication. In a practical implementation, the further communication unit 204 is a Wi-Fi communication unit. In that case, the antenna 206 can easily be shared. It is noted that the further communication unit may also be another type of communication unit, such as a cellular communication unit or a Bluetooth communication unit.

In one or more embodiments, the communication device 200 further comprises a processing unit configured to trigger the UWB communication unit 202 to transmit the request to the further communication unit 204. For instance, the processing unit may be an application processor configured to execute a car access application that uses UWB ranging data received through the UWB communication unit 202 as input to determine whether access should be granted. In this case, the processing unit may have more knowledge on the priority of the UWB ranging operations which should be performed and may therefore be in a better position to decide on sending the aforementioned request. In one or more embodiments, the further communication unit 204 is configured to allow the UWB communication unit 202 to use the antenna for a predefined amount of time. For example, the predefined amount of time may be a multiple of 10 milliseconds. In this way, it may for example be ensured that the UWB communication unit 202 can properly perform one or more UWB ranging operations. For instance, the amount of time may be configured in dependence on an application that is executed by the communication device 200, such as the previously mentioned car access application.

In a practical implementation, the UWB communication unit 202 and the further communication unit 204 are coupled to each other through a universal asynchronous receiver/transmitter (UART) interface. Thereby, the interaction between the UWB communication unit 202 and the further communication unit 204 is facilitated. Furthermore, in a practical implementation, the further communication unit 204 is configured to act as a master device to control the usage of the antenna 206. In this way, the further communication unit 204 may remain in control of the usage of the antenna 206 and for example ensure that communication sessions performed through the further communication unit 204 are not negatively affected.

In alternative embodiment of the communication device (not shown), the device comprises a UWB communication unit configured to set up a UWB communication channel with a first external communication device, a further communication unit configured to set up a further communication channel with a second external communication device, a first antenna configured to be used by the UWB communication unit and a second antenna configured to be used by the further communication unit, wherein the first antenna and the second antenna have a shared frequency spectrum. In this alternative embodiment, the UWB communication unit is also operatively coupled to the further communication unit, and the further communication unit is configured to grant the UWB communication unit access to the shared frequency spectrum in response to receiving a request from the UWB communication unit. This embodiment represents an alternative solution to the problem of how to facilitate avoiding that UWB ranging rounds fail in a co-existence system. In this co-existence system, the antenna is not a shared antenna, but separate antennas are used by the UWB communication unit and the further communication unit. However, since these antennas uses a shared frequency spectrum, UWB ranging rounds may fail due to transmissions by the further communication unit in the shared frequency spectrum. Since the further communication unit is configured to grant access to the shared frequency spectrum, collisions of this kind can be avoided more easily.

Figure 3:
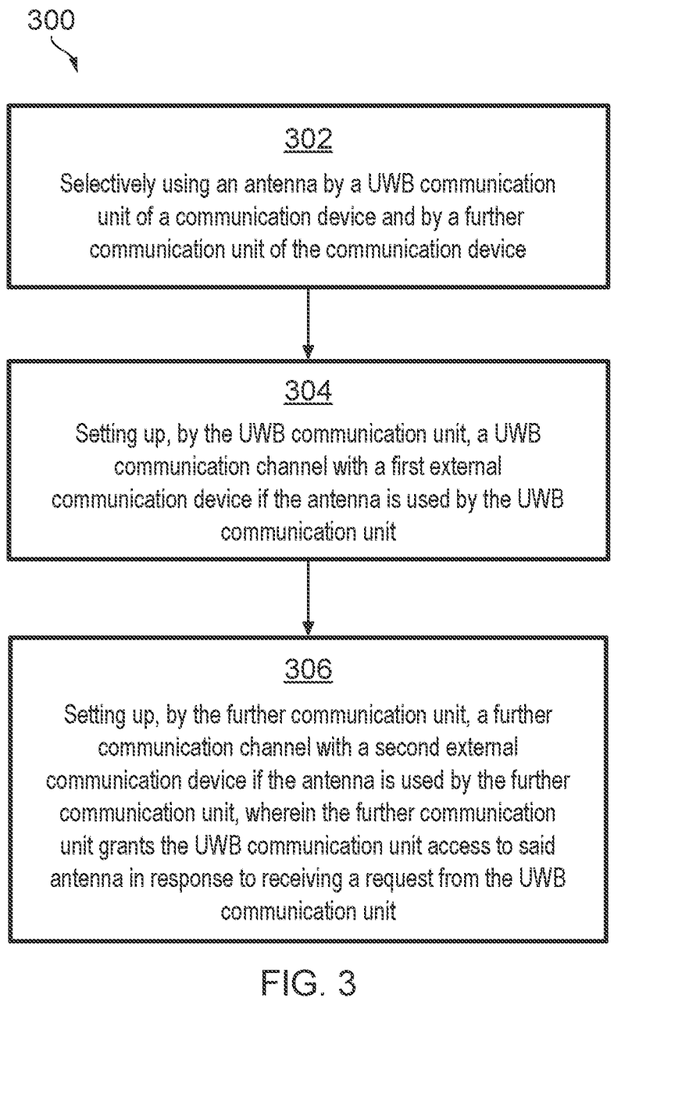
FIG. 3 shows an illustrative embodiment of a method of operating a communication device.

FIG. 3 shows an illustrative embodiment of a method 300 of operating a communication device of the kind set forth. The method 300 comprises the following steps. At 302, an antenna of a communication device is selectively used by a UWB communication unit of the communication device and by a further communication unit of the communication device. At 304, the UWB communication unit sets up a UWB communication channel with a first external communication device if the antenna is used by the UWB communication unit. Furthermore, at 306, the further communication unit sets up a further communication channel with a second external communication device if the antenna is used by the further communication unit, wherein the further communication unit allows the UWB communication unit to use said antenna in response to receiving a request from the UWB communication unit. In this way, the UWB communication unit may indicate to the further communication unit that for instance high priority ranging operations should be performed, and the further communication unit may allow the UWB communication unit to use the antenna in response thereto. This, in turn, facilitates avoiding that UWB ranging rounds fail in a co-existence system in which the antenna is shared. It is noted that the method 300 may at least partially be implemented as a computer program.

Figure 4:
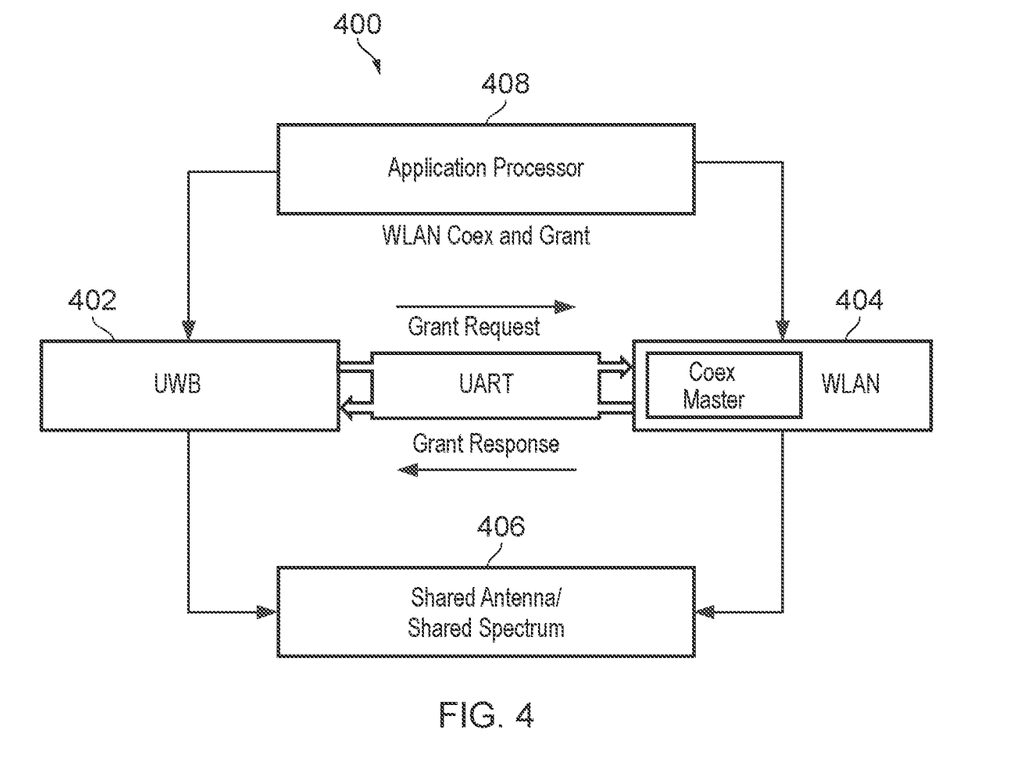
FIG. 4 shows another illustrative embodiment of a communication device.

FIG. 4 shows another illustrative embodiment of a communication device 400. The communication device 400 includes a UWB communication unit 402, a WLAN communication unit 404, a shared antenna or a shared frequency spectrum 406, and an application processor 408. The UWB communication unit 402 and the WLAN communication unit 404 are coupled to each other through a UART interface. Through said interface, the UWB communication unit 402 may transmit a request for usage of for example the shared antenna 408 to the WLAN communication unit 404. The WLAN communication unit 404 may grant said request and inform the UWB communication 402 accordingly through the same interface. The communication between the UWB communication unit 402 and the WLAN communication unit 404 may be half duplex in nature. Furthermore, the WLAN communication unit 404 may for example control an RF switch (not shown) so as to enable antenna usage by the UWB communication unit 402 or release control of said RF switch in such a manner that the UWB communication unit 402 may temporarily control the usage of the antenna.

Thus, by sending a request for the use of a shared medium (i.e., a shared antenna or a shared frequency spectrum 406), the UWB communication unit 402 may make the WLAN communication unit 404 aware of a high priority need for using the shared medium. Furthermore, the application processor 408 may configure a UWB ranging session with a maximum number of consecutive failed ranging rounds, which can be accepted as a tolerance limit for a given use case. Then, once the tolerance limit is reached, the UWB communication unit 402 may request the WLAN communication 404 to grant usage of the shared medium. Although the WLAN communication unit 404 may remain in control of the usage of the shared medium, this request should not be denied, or only be denied under very exceptional circumstances when WLAN communication cannot be aborted (i.e., when an ongoing WLAN communication is more critical than the UWB ranging rounds). Thus, the WLAN communication unit 404 should ensure that the shared medium (i.e., the antenna or frequency spectrum 406) is made available on time for important UWB use cases. To facilitate this, different types of requests may be made by the UWB communication unit 402, for instance critical priority requests and normal priority requests. In that case, the WLAN communication unit 404 may be configured in such a way that critical priority requests are never denied, while normal priority requests may be denied if the WLAN communication unit 404 is performing a high-priority communication task.

Now an example will be described of different types of requests which can be made in accordance with the present disclosure. In case of a critical priority request, the request can be made in advance and the "grant duration" may be specified in milliseconds. This duration may be the minimum time required to complete a UWB ranging round. Once the request is made, the WLAN communication unit 404 should grant access to the UWB communication unit 402 and should not take back the control from the UWB communication unit 402 until the grant duration time has expired. For example, the WLAN communication unit 404 may give the UWB communication unit 402 temporary control over an RF switch in case a shared antenna is used. In case of a normal priority request, the request can again be made in advance and the "grant duration" may be specified in milliseconds. The WLAN communication unit 404 may acknowledge the grant request and grant access to the shared antenna or shared frequency spectrum 406, but a request with the priority level may not be granted every time and allow the application to drive certain critical WLAN use cases.

A UWB session may be programmed or configured in such a way that it contains an indication of how critical the session is. For example, a flag may determine whether a particular session is critical or non-critical. In the former case, the UWB communication unit 402 may transmit critical priority requests for usage of the antenna or frequency spectrum 406, while in the latter case, the UWB communication unit 402 may transmit normal priority requests. For normal priority requests, a tolerance limit for consecutive failed ranging rounds may be specified. When this tolerance limit is reached, the UWB communication unit 402 may transmit a critical priority request instead of normal priority requests, to ensure that a UWB session can be completed (for example, to avoid that the UWB communication counterpart enters into a power-down state or to prevent that the system raises a false security breach alarm).

In case a shared spectrum is used, the UWB communication unit 402 may transmit a request for usage of the shared frequency spectrum to the WLAN communication unit 404. The WLAN communication unit 404 may grant said request and inform the UWB communication 402 accordingly through the same interface. As mentioned above, the communication between the UWB communication unit t02 and the WLAN communication unit 404 may be half duplex in nature. Furthermore, the WLAN communication unit 404 may for example refrain from using its antenna for data transmissions for the period during which it has given the UWB communication unit 402 access to the shared spectrum, to avoid interference when the UWB communication unit 402 uses its antenna to perform ranging operations. Thus, in this embodiment, the WLAN communication 404 may signal to the UWB communication unit 402 that the latter may use the shared frequency spectrum for a period requested by the UWB communication 402, and simultaneously mark this period as an inactive transmission period for its own operations.

Figure 5:
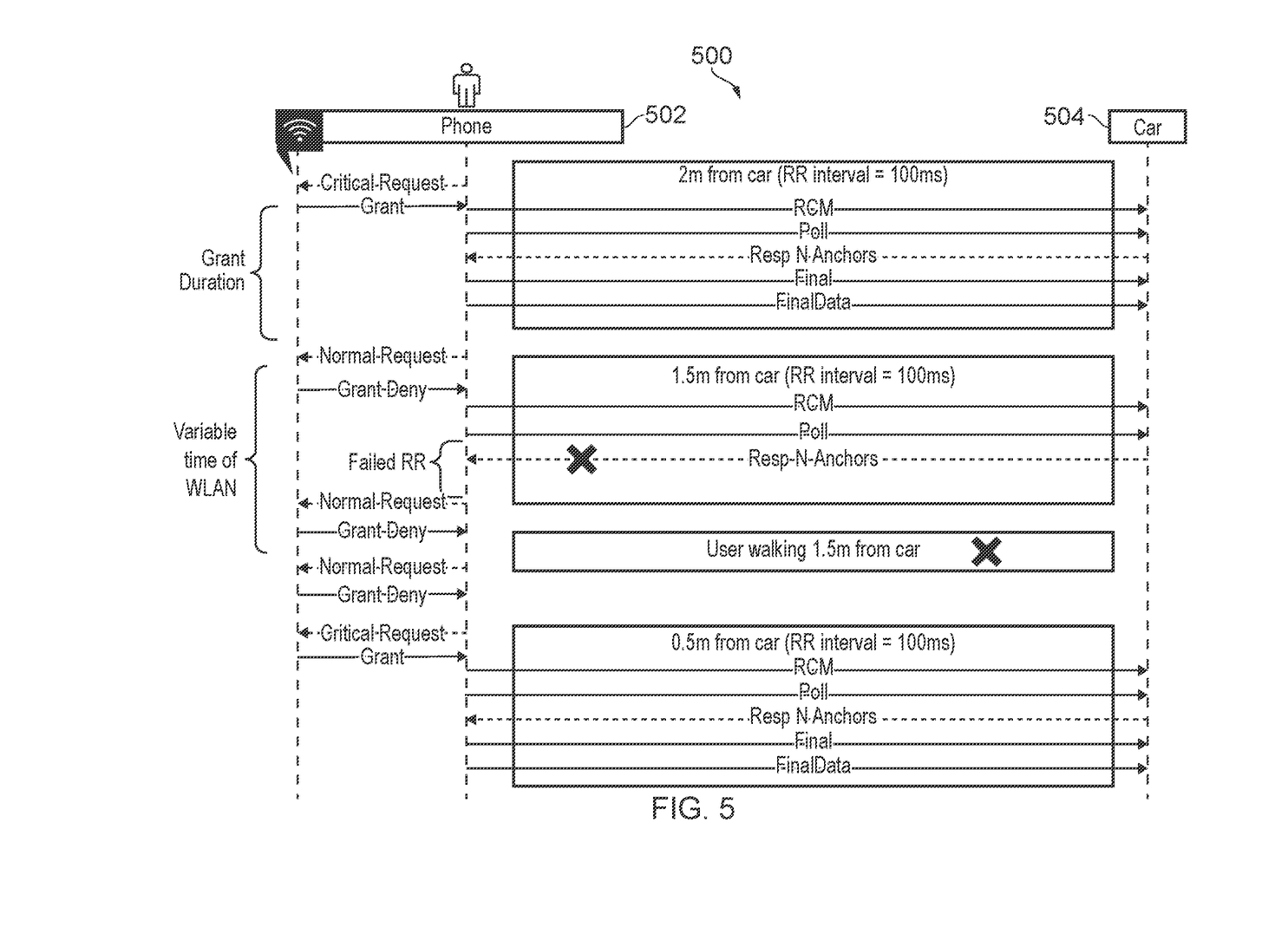
FIG. 5 shows an illustrative embodiment of a communication system.

FIG. 5 shows an illustrative embodiment of a communication system 500. In particular, FIG. 5 shows an example of a communication system 500 in which a shared antenna is used. The communication system 500 includes a mobile phone 502 carried by a user, which performs UWB ranging operations with a car 504. For this purpose, both the mobile phone 502 and the car 504 contain a UWB communication unit (not shown). More specifically, the mobile phone 502 performs ranging operations with a plurality of anchor nodes in the car 504, each of which contains a UWB communication unit of the kind set forth. The UWB communication unit of the mobile phone 502 shares an antenna with a Wi-Fi communication unit of the phone 502. A first ranging round (RR) is carried out when the mobile phone 102 is located at approximately 2 meters of the car 104. This ranging round is successfully executed. However, the next ranging round, executed at a distance of 1.5 meters fails because a Wi-Fi communication session is executed by the mobile phone 502, as a result of which the phone's UWB communication unit cannot use the shared antenna. In accordance with the present disclosure, the UWB communication unit of the phone 502 transmits a critical priority request for antenna usage to the Wi-Fi communication unit of the phone 502. Then, when the UWB communication unit is granted access to the shared antenna, it can successfully execute a next ranging round at a distance of 0.5 meter of the car 504. In that case, the car access application may still grant the phone 502 access to the car 504, based on the successful ranging rounds executed at respectively 2 meters and 0.5 meter from the car 504.

As mentioned above, different types of requests may be made by the UWB communication unit, for instance critical priority requests and normal priority requests. This applies both the embodiment in which a shared antenna is used and to the embodiment in which the UWB communication unit and the WLAN communication unit use separate antennas having a shared frequency spectrum. The different types of requests may for example be implemented as described below.

The priority requests may be regarded as control messages that specify a predefined grant duration. In particular, two parameters may be used: an advance grant duration and an active grant duration. The advance grant duration may specify the time in milliseconds that will elapse between the moment of the request and the moment at which the UWB communication unit should have access to the shared medium (i.e., the shared antenna or the shared frequency spectrum). This advance grant duration parameter can be used as a preparation to relinquish the shared medium by the WLAN communication unit. In other words, the WLAN communication may receive an indication of the amount of time which is still available for completing its own operations. The active grant duration parameter may specify the time in milliseconds which the UWB communication unit needs for performing its operations. For example, the active grant duration may be based on the expected duration of one or more ranging operations as well as a margin for taking into account delays occurring when said ranging operations are performed.

Furthermore, critical priority requests may be requests that should always be granted by the WLAN communication unit, while normal priority requests may be requests that may be rejected by the WLAN communication unit. In addition, if such normal priority requests are rejected a predefined number of times (e.g., 3 or more times), then the UWB communication unit may subsequently send a critical priority request, which cannot be rejected. In this way, a trade-off may be achieved between the performance of the UWB communication unit and the performance of the WLAN communication unit.

In an example, a control message of the kind set forth may include a two-byte payload structure as shown in Table 1. In that case, the first byte (Byte 0) may be used as a message header that includes a Message Type [MT] field (bit 6-bit 3) and a Control/Data field (bit 2-bit 0), and the second byte (Byte 1) may be used to carry a data payload. Furthermore, bit 7 of the second byte (Byte 1) may indicate whether a next byte follows. The message type field may carry control content and data content, where control content should be responded to within 10 milliseconds, for instance. The data content may have a critical response time, but the UWB communication unit should not post a new control message without receiving the response to the current control message.

TABLE 1

| \multicolumn{8}{c}{Byte 0} |
|----|----|----|----|----|----|----|----|
| b7 | b6 | b5 | b4 | b3 | b2 | b1 | b0 |
| 1 | \multicolumn{3}{c}{Message Type [MT] field} | | | \multicolumn{3}{c}{Control/Data field} | | |

| \multicolumn{8}{c}{Byte 1} |
|----|----|----|----|----|----|----|----|
| b7 | b6 | b5 | b4 | b3 | b2 | b1 | b0 |
| 0 | \multicolumn{7}{c}{Payload field} | | | | | | |

Figure 6:
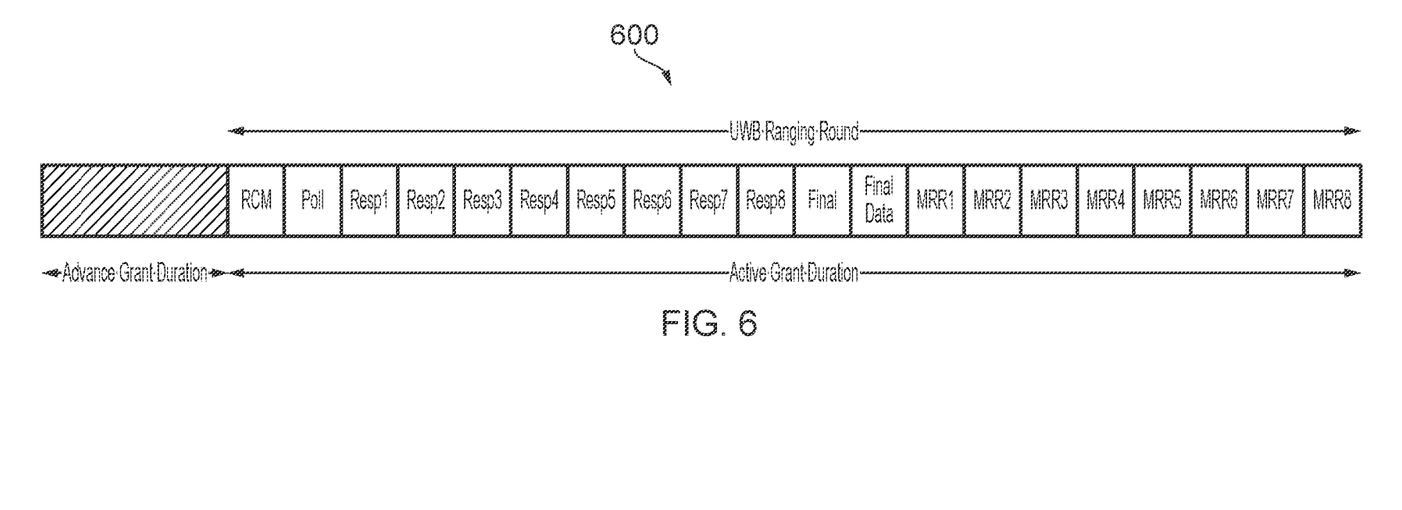
FIG. 6 shows an illustrative embodiment of a UWB ranging round.

FIG. 6 shows an illustrative embodiment of a UWB ranging round 600. The ranging round 600 includes a plurality of ranging operations between a UWB communication unit of the kind set forth and a plurality of external responder nodes. In accordance with the present disclosure, the UWB ranging round may be performed in a period whose length corresponds to the active grant duration parameter value. Furthermore, another period, whose length corresponds to the advance grant duration parameter value, may elapse before the UWB ranging round 600 is performed. In the present example, the ranging round 600 includes ranging operations with 8 different responder nodes (i.e., anchors), each of which sends a response to a poll message sent by the UWB communication unit. Furthermore, a measurement report phase is enabled for each of the responder nodes. The UWB ranging round 600 period may be divided into slots having a length of 2 milliseconds, resulting in a total ranging round length of 40 milliseconds.

An example of a grant request is shown in Table 2. Such a request is transmitted from the UWB communication unit to the WLAN communication unit, for example through the UART interface shown in FIG. 4.

TABLE 2

| \multicolumn{8}{c}{Byte 0} |
|----|----|----|----|----|----|----|----|
| b7 | b6 | b5 | b4 | b3 | b2 | b1 | b0 |
| 1 | \multicolumn{4}{l}{MT = 0 Medium Grant Request} | | | | \multicolumn{3}{l}{Advance Grant Duration in 10 ms scale} | | |

| \multicolumn{8}{c}{Byte 1} |
|----|----|----|----|----|----|----|----|
| b7 | b6 | b5 | b4 | b3 | b2 | b1 | b0 |
| 0 | \multicolumn{4}{l}{0-Normal/1-Critical} | | | | \multicolumn{3}{l}{Active Grant Duration in 2 ms scale} | | |

The UWB communication unit may be configured to send a grant request in advance, i.e. before it will initiate a ranging round. The amount of time between the request and the intended occupation of the shared medium (e.g., the start of the ranging round) may be specified by the advance grant duration parameter, whose value is specified by bit 2-bit 0 of the first byte (Byte 0). The advance grant duration parameter is useful to ensure that the WLAN communication unit may complete its ongoing operation, before granting access to the shared medium. The priority of the grant request is specified in Byte 0 of the transport message. If the request is done with a normal priority, then the WLAN communication unit may choose to respond with a rejected code if it is unable to complete or abort its ongoing operation. However, if the request is done with a critical priority, then the WLAN communication unit should respond with an accept code and should relinquish the shared medium to the UWB communication unit. It is noted that a tolerance limit may be set for successive rejected grant requests with a normal priority. When this tolerance limit has been reached, the UWB communication unit will send a grant request having a critical priority. For example, the tolerance limit may be a minimum of 3 counts. The active grant duration is specified in bit 5-bit 0 of the second byte (Byte 1) of the transport message. It is noted that the UWB communication unit may set a UART break condition to indicate the usage of the shared medium; in this status the UWB communication unit may receive messages from the WLAN communication unit.

An example of a grant response is shown in Table 3. Such a request is transmitted from the WLAN communication unit to the UWB communication unit, for example through the UART interface shown in FIG. 4.

TABLE 3

| \multicolumn{8}{c}{Byte 0} |
|----|----|----|----|----|----|----|----|
| b7 | b6 | b5 | b4 | b3 | b2 | b1 | b0 |
| 1 | \multicolumn{3}{l}{MT = 1 Medium Grant Response} | | | \multicolumn{2}{l}{RFU} | | \multicolumn{1}{l}{0-Accept/1-Reject} |

The grant response is an indication to the UWB communication unit to use the shared medium. If the grant response is not received within for example a period of 10 milliseconds, then the UWB communication unit may assume that the shared medium is available. A normal priority request may be rejected by the WLAN communication unit, but a critical priority request should be accepted, such that the WLAN communication unit may have to refrain from performing operations until the UWB communication unit has finished its active ranging round. As mentioned, in this way, a trade-off may be achieved between the performance of the UWB communication unit and the performance of the WLAN communication unit. It is noted that the UWB communication unit may set the UART break condition if it has not received a UART break condition within 10 milliseconds and start carrying out a ranging round within the period specified by the advance grant duration parameter. If a grant response having a reject code is received in response to a normal priority request when the UWB communication unit is performing the ranging round, then it may have to abort the ranging round and send another grant request (i.e., a grant request having a critical priority). In such a scenario, the UWB communication unit may have to abort the ranging round within 10 milliseconds of receiving the grant response having the reject code. Furthermore, it is noted that the WLAN communication unit may have to ensure that a grant response having a reject code is not sent in response to a normal priority request after the period specified by the advance grant duration parameter has expired. In such a scenario, when a grant response is received during the period specified by the active grant duration parameter, then the UWB communication unit may ignore the response and continue with its ongoing ranging round. However, in that case the integrity of the ranging round may be negatively affected—since data transmissions by the WLAN communication unit may interfere with it—and consequently the UWB communication unit may report a failure with an appropriate error code to the application processor. It is noted that data messages have no critical response time, contrary to control messages. In particular, data message transmissions may be retried if they are not received within a previously agreed upon time frame.

Figure 7:
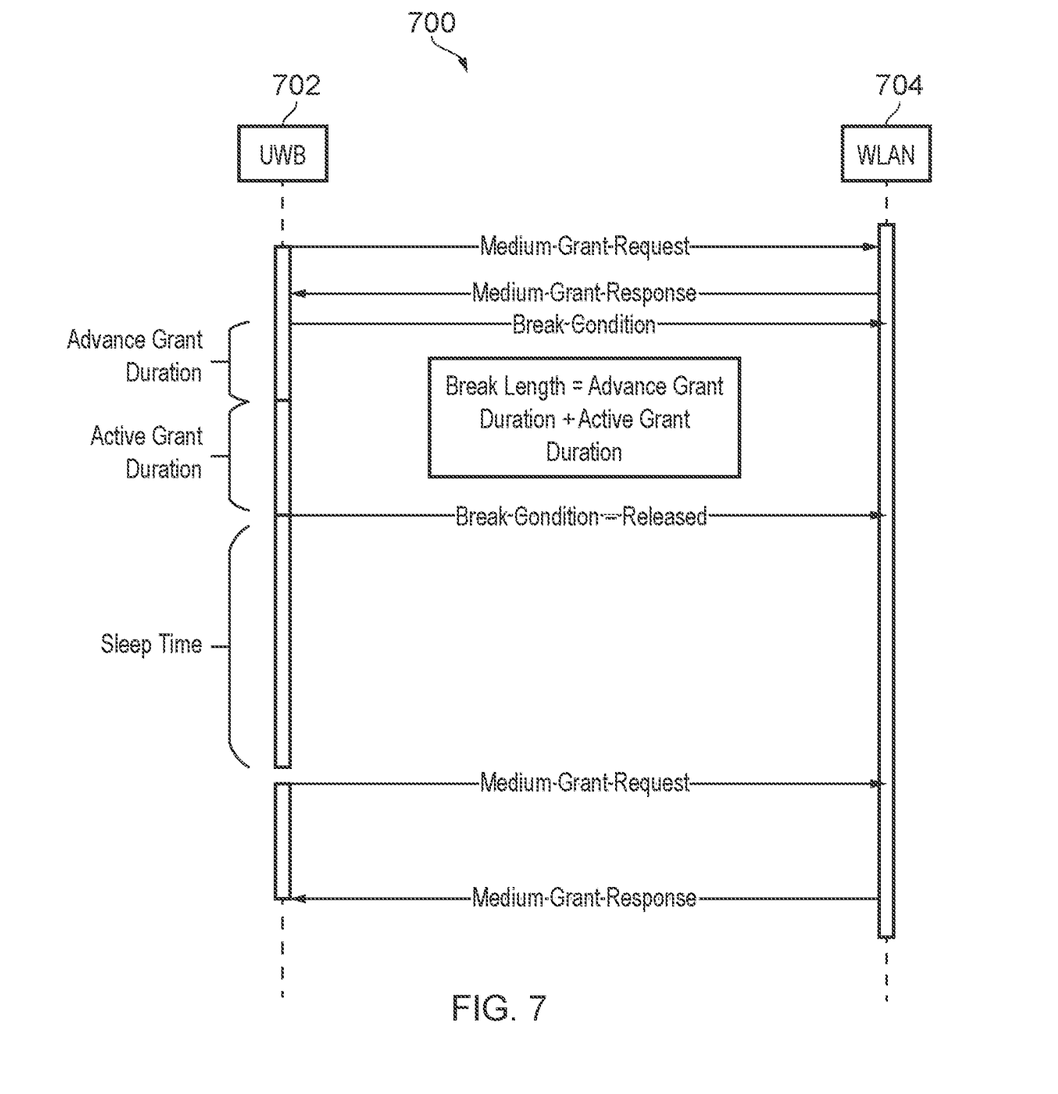
FIG. 7 shows an illustrative embodiment of a message flow.

FIG. 7 shows an illustrative embodiment of a message flow 700. In particular, a message flow is shown between a UWB communication unit 702 and a WLAN communication unit 704 of the kind set forth. It is noted that the UWB communication unit 702 and the WLAN communication unit 704 may be kept in active state. In particular, FIG. 7 shows that the grant request and the grant response may follow a regular sequence of operations. From an application perspective, particular UWB sessions may be programmed beforehand, to assign a criticality level to said sessions. Accordingly, UWB sessions may be classified as critical sessions and normal sessions. In that case, critical sessions may always be preceded by a critical priority request from the UWB communication unit, while normal sessions may be preceded by one or more normal priority requests. In the latter case, the aforementioned tolerance limit may be set. When the tolerance limit is reached, the UWB communication unit may send a medium grant request with a critical priority to ensure the survival of the UWB session, for example to avoid that a responder node enters a deep power-down state or to prevent that the system erroneously detects a security attack.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 communication system
102 mobile phone
104 car
200 communication device
202 UWB communication unit
204 further communication unit
206 shared antenna
300 method of operating a communication device
302 selectively using an antenna by a UWB communication unit of a communication device and by a further communication unit of the communication device
304 setting up, by the UWB communication unit, a UWB communication channel with a first external communication device if the antenna is used by the UWB communication unit
306 setting up, by the further communication unit, a further communication channel with a second external communication device if the antenna is used by the further communication unit, wherein the further communication unit allows the UWB communication unit to use said antenna in response to receiving a request from the UWB communication unit
400 communication device
402 UWB communication unit
404 WLAN communication unit
406 shared antenna/shared spectrum
408 application processor
500 communication system
502 phone
504 car
600 UWB ranging round
700 message flow
702 UWB communication unit
704 WLAN communication unit

The invention claimed is:

1. A communication device, comprising:
an ultra-wideband, UWB, communication device configured to set up a UWB communication channel with a first external communication device;
a further communication device configured to set up a further communication channel with a second external communication device; and
an antenna configured to be selectively used by the UWB communication device and the further communication device;
wherein the UWB communication device is operatively coupled to the further communication device, wherein the further communication device is configured to grant the UWB communication device access to said antenna in response to receiving a critical grant request from the UWB communication device,
wherein the UWB communication device is configured to transmit the critical grant request to the further communication device after a predetermined number of consecutive failed normal priority communication attempts, wherein the critical grant request is not denied after the failed normal priority communication attempts, and
wherein the critical grant request is made using a critical grant request message transmitted from the UWB communication unit to the further communication unit requests access to the antenna by the UWB communication device has an advance grant duration parameter bit field that specifies a time that will elapse between a time of the request and a time at which the UWB communication device receives access to the antenna, and an active grant duration parameter bit field that specifies an amount of time that the UWB communication device needs for completing a ranging round including a plurality of ranging operations with a plurality of external responder nodes.

2. The communication device of claim 1, wherein the further communication device is a Wi-Fi communication device.

3. The communication device of claim 1, further comprising a processor configured to trigger the UWB communication unit to transmit said critical grant request to the further communication device.

4. The communication device of claim 1, wherein the UWB communication device and the further communication device are coupled to each other through a universal asynchronous receiver/transmitter, UART, interface.

5. The communication device of claim 1, wherein the further communication device is configured to act as a master device to control the usage of the antenna.

6. A communication device, comprising:
an ultra-wideband, UWB, communication device configured to set up a UWB communication channel with a first external communication device;
a further communication device configured to set up a further communication channel with a second external communication device;
a first antenna configured to be used by the UWB communication device and a second antenna configured to be used by the further communication device, wherein the first antenna and the second antenna have a shared frequency spectrum;
wherein the UWB communication device is operatively coupled to the further communication device, and wherein the further communication device is configured to grant the UWB communication device access to the shared frequency spectrum in response to receiving a critical grant request from the UWB communication device,
wherein the UWB communication device is configured to transmit the critical grant request to the further communication device after a predetermined number of consecutive failed normal priority communication attempts, wherein the critical grant request is not denied after the failed normal priority communication attempts, and
wherein the critical grant request is made using a critical grant request message transmitted from the UWB communication unit to the further communication unit requests access to the shared frequency spectrum by the UWB communication device has an advance grant duration parameter bit field that specifies a time that will elapse between a time of the request and a time at which the UWB communication device receives access to the shared frequency spectrum, and an active grant duration parameter bit field that specifies an amount of time that the UWB communication device needs for completing a ranging round including a plurality of ranging operations with a plurality of external responder nodes.

7. The communication device of claim 6, wherein the further communication device is a Wi-Fi communication device.

8. The communication device of claim 6, further comprising a processor configured to trigger the UWB communication device to transmit said critical request to the further communication device.

9. A method of operating a communication device, comprising:
- selectively using an antenna by an ultra-wideband, UWB, communication device of the communication device and by a further communication device of the communication device;
- setting up, by the UWB communication device, a UWB communication channel with a first external communication device if the antenna is used by the UWB communication device; and
- setting up, by the further communication device, a further communication channel with a second external communication device if the antenna is used by the further communication device;
- wherein the further communication device grants the UWB communication device access to said antenna in response to receiving a critical grant request from the UWB communication device,
- wherein the UWB communication device is configured to transmit the request to the further communication device after a predetermined number of consecutive failed communication attempts, wherein the critical grant request is not denied after the failed normal priority communication attempts, and
- wherein the critical grant request is made using a critical grant request message transmitted from the UWB communication unit to the further communication unit requests access to the antenna by the UWB communication device has an advance grant duration parameter bit field that specifies a time that will elapse between a time of the request and a time at which the UWB communication device receives access to the antenna, and an active grant duration parameter bit field that specifies an amount of time that the UWB communication device needs for completing a ranging round including a plurality of ranging operations with a plurality of external responder nodes.

10. The method of claim 9, wherein the method is implemented in a computer program comprising executable instructions stored in a non-transitory computer-readable medium which, when executed by a communication device, carry out the method.

11. A method of operating a communication device, comprising:
- sharing a frequency spectrum by a first antenna of an ultra-wideband, UWB, communication device of the communication device and by a second antenna of a further communication device of the communication device;
- setting up, by the UWB communication device, a UWB communication channel with a first external communication device if the first antenna is used by the UWB communication device;
- setting up, by the further communication device, a further communication channel with a second external communication device if the second antenna is used by the further communication device;
- wherein the further communication device grants the UWB communication device access to said frequency spectrum in response to receiving a critical grant request from the UWB communication device,
- wherein the UWB communication device is configured to transmit the critical grant request to the further communication device after a predetermined number of consecutive failed communication attempts, wherein the critical grant request is not denied after the failed normal priority communication attempts, and
- wherein the critical grant request is made using a critical grant request message transmitted from the UWB communication unit to the further communication unit requests access to the frequency spectrum by the UWB communication device has an advance grant duration that specifies a time that will elapse between a time of the request and a time at which the UWB communication device receives access to the frequency spectrum, and an active grant duration parameter bit field that specifies an amount of time that the UWB communication device needs for completing a ranging round including a plurality of ranging operations with a plurality of external responder nodes.

12. The method of claim 11, wherein the method is implemented in a computer program comprising executable instructions stored in a non-transitory computer-readable medium which, when executed by a communication device, carry out the method.

* * * * *